United States Patent
Hara et al.

(10) Patent No.: US 11,440,529 B2
(45) Date of Patent: Sep. 13, 2022

(54) CONTROLLER FOR HYBRID VEHICLE

(71) Applicant: TOYOTA JIDOSHA KABUSHIKI KAISHA, Toyota (JP)

(72) Inventors: Shunichi Hara, Toyota (JP); Ryuta Teraya, Nagoya (JP); Daigo Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 16/687,784

(22) Filed: Nov. 19, 2019

(65) Prior Publication Data

US 2020/0223426 A1 Jul. 16, 2020

(30) Foreign Application Priority Data

Jan. 10, 2019 (JP) ............... JP2019-002491

(51) Int. Cl.
B60W 20/15 (2016.01)
B60L 50/60 (2019.01)
(Continued)

(52) U.S. Cl.
CPC .............. B60W 20/15 (2016.01); B60L 50/10 (2019.02); B60L 50/66 (2019.02); B60W 10/06 (2013.01);
(Continued)

(58) Field of Classification Search
CPC ...... B60W 20/15; B60W 10/06; B60W 10/08; B60W 2510/0676; B60W 2520/10;
(Continued)

(56) References Cited

U.S. PATENT DOCUMENTS

2010/0063659 A1* 3/2010 Ogiso ............... B60L 50/61
  701/22
2011/0257821 A1* 10/2011 Beaucaire ........... B60W 10/08
  701/22

(Continued)

FOREIGN PATENT DOCUMENTS

JP    2003-65132 A    3/2003
JP    2004052641 A * 2/2004 ............ Y02T 10/40
(Continued)

*Primary Examiner* — George C Jin
(74) *Attorney, Agent, or Firm* — Oliff PLC (57) ABSTRACT

A controller includes an engine controlling section and a motor-generator controlling section. The controller is configured to use the engine controlling section and the motor-generator controlling section to execute an intermittent stop control, a temperature increase control, an intermittent stop prohibition control, and a motoring control. The intermittent stop control automatically stops and restarts operation of an internal combustion engine. The temperature increase control increases the temperature of a filter in the exhaust passage to a temperature at which PM can be burned. The intermittent stop prohibition control prohibits stop of the operation of the internal combustion engine by the intermittent stop control until the temperature increase control is completed. The motoring control drives the output shaft of the internal combustion engine by the motor-generator, thereby forcibly rotating the internal combustion engine.

14 Claims, 5 Drawing Sheets

(51) Int. Cl.
*F02D 41/02* (2006.01)
*F02P 5/15* (2006.01)
*F01N 3/035* (2006.01)
*B60W 10/06* (2006.01)
*B60W 10/08* (2006.01)
*F02N 11/08* (2006.01)
*B60L 50/10* (2019.01)

(52) U.S. Cl.
CPC ............ *B60W 10/08* (2013.01); *F01N 3/035* (2013.01); *F02D 41/029* (2013.01); *F02D 41/0245* (2013.01); *F02D 41/0255* (2013.01); *F02N 11/084* (2013.01); *F02N 11/0829* (2013.01); *F02P 5/15* (2013.01); *B60W 2510/0676* (2013.01); *B60W 2520/10* (2013.01); *B60W 2710/06* (2013.01); *F02D 2041/026* (2013.01); *F02D 2200/0802* (2013.01); *F02D 2200/0812* (2013.01); *F02D 2200/101* (2013.01); *F02D 2200/501* (2013.01); *F02N 2200/0801* (2013.01)

(58) Field of Classification Search
CPC ..... B60W 2710/06; B60L 50/10; B60L 50/66; F01N 3/035; F02D 41/0245; F02D 41/029; F02N 11/0829; F02N 11/084; F02P 5/15

See application file for complete search history.

(56) References Cited

U.S. PATENT DOCUMENTS

| 2012/0209466 | A1 | 8/2012 | Ogiso |
| 2012/0210699 | A1* | 8/2012 | Ruhland ................. F01N 3/023 60/274 |
| 2016/0339905 | A1 | 11/2016 | Inoue et al. |
| 2017/0096920 | A1 | 4/2017 | Fujii |
| 2019/0301329 | A1* | 10/2019 | Zink ..................... F02D 41/029 |
| 2020/0032762 | A1* | 1/2020 | Hosogi ............... F02D 41/2438 |

FOREIGN PATENT DOCUMENTS

| JP | 2005-90259 A | 4/2005 |
| JP | 2008-080875 A | 4/2008 |
| JP | 2009-203934 A | 9/2009 |
| JP | 2011-099451 A | 5/2011 |
| JP | 2015-128935 A | 7/2015 |
| JP | 2015-140150 A | 8/2015 |
| JP | 2015-222027 A | 12/2015 |

* cited by examiner

CONTROLLER FOR HYBRID VEHICLE

BACKGROUND

1. Field

The present disclosure relates to a controller for a hybrid vehicle.

2. Description of Related Art

Japanese Laid-Open Patent Publication No. 2005-90259 discloses an exhaust purification device for an internal combustion engine that includes a filter configured to trap particulate matter (hereinafter, referred to as PM) contained in exhaust gas. In an internal combustion engine equipped with the exhaust purification device, a filter regeneration control is performed to burn and remove deposited in the filter. The internal combustion engine equipped with the exhaust purification device is mounted on a hybrid vehicle. When burning PM, the controller for the internal combustion engine increases the amount of heat generated by increasing the power generation load of the generator, which generates power using the driving force of the internal combustion engine, and increasing the output of the internal combustion engine. This increases the temperature of the filter to a temperature at which PM can be burned, so that the PM deposited in the filter is burned.

In a hybrid vehicle, an intermittent stop control is executed in which operation of the internal combustion engine is automatically stopped and restarted. When the operation of the internal combustion engine is frequently stopped by the intermittent stop control, the temperature of the filter drops each time the internal combustion engine is stopped. The filter regeneration control takes a long time to be completed. Accordingly, the deposition amount of PM is gradually increased and may exceed the permissible range.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller configured to control a hybrid vehicle is provided. The hybrid vehicle has a battery that is charged with power generated by a motor-generator using output of an internal combustion engine. The controller includes an engine controlling section configured to control the internal combustion engine and a motor-generator controlling section configured to control the motor-generator. The controller is configured to use the engine controlling section and the motor-generator controlling section to: execute an intermittent stop control of automatically stopping and restarting operation of the internal combustion engine; execute a temperature increase control of increasing the output of the internal combustion engine to increase an amount of generated heat and increasing an amount of power generated by the motor-generator, thereby increasing a temperature of a filter provided in an exhaust passage of the internal combustion engine to a temperature at which particulate matter can be burned; execute an intermittent stop prohibition control of prohibiting stop of the operation of the internal combustion engine from when the temperature increase control is started to when the temperature increase control is completed; and execute a motoring control of driving an output shaft of the internal combustion engine using the motor-generator on condition that the temperature of the filter is the temperature at which the particulate matter can be burned, thereby forcibly rotating the internal combustion engine.

With the above-described configuration, the temperature increase control is executed, and the motoring control is executed when the temperature of the filter is a temperature at which PM can be burned. When the motoring control is executed, oxygen is supplied to the high-temperature filter as the internal combustion engine is forcibly rotated. This burns PM deposited in the filter. That is, the above-described controller implements the filter regeneration control through the temperature increase control and the motoring control.

The above-described controller is configured to, when the temperature increase control is started, prohibit stop of the operation of the internal combustion engine through the intermittent stop control until the temperature increase control is completed. Thus, the temperature increase control is prevented from being interrupted by stop of the operation of the internal combustion engine. Accordingly, the temperature increase control is completed quickly to burn PM.

In one general aspect, the controller for a hybrid vehicle is configured to, in the temperature increase control, execute an output raising control of increasing a requested output as a control of increasing the output of the internal combustion engine.

In the temperature increase control, the output raising control increases the requested output, which corresponds to the target value in the output control executed by the engine controlling section. This increases the output of the internal combustion engine as compared to a case in which the output raising control is not executed.

In one general aspect, the controller for a hybrid vehicle is configured to, in the temperature increase control, execute a lower limit raising control of raising a lower limit of an engine rotation speed, in addition to the output raising control.

Even if the requested output is zero, that is, even if there is no request for output from the internal combustion engine, the execution of the lower limit raising control in addition to the output raising control causes the internal combustion engine to continue to operate at an engine rotation speed higher than that in a case in which the lower limit raising control is not executed. Therefore, the temperature of the filter continues to increase even if there is no request for output from the internal combustion engine.

In one general aspect, the controller for a hybrid vehicle is configured to, in the temperature increase control, execute an ignition timing retardation control of retarding an ignition timing, in addition to the output raising control.

With the above-described configuration, the exhaust temperature is increased by retarding the ignition timing. Accordingly, the temperature increase control is executed effectively. When the output raising control and the ignition timing retardation control are executed together in the temperature increase control, the ignition timing is retarded at an operating point of a higher load and a greater intake air amount. Thus, the exhaust temperature is increased while suppressing the occurrence of misfire due to retardation of the ignition timing.

In one general aspect, the controller for a hybrid vehicle is configured to: execute the ignition timing retardation control in the temperature increase control on condition that a deposit amount of the particulate matter in the filter is greater than or equal to a specified deposit amount; and prohibit the ignition timing retardation control in the temperature increase control when the deposit amount of the particulate matter in the filter is less than the specified deposit amount.

When the ignition timing is retarded, the amount of fuel consumed to gain the same output is increased. Thus, as in the above-described configuration, the ignition timing retardation control is executed during the temperature increase control only in a case in which the deposition amount of PM is great and the temperature increase control is preferably completed at an early stage. This allows fuel to be used efficiently in correspondence with the need for temperature increase.

In one general aspect, the controller for a hybrid vehicle is configured to, in the ignition timing retardation control, progressively reduce an amount of retardation of the ignition timing as a deposit amount of the particulate matter decreases.

This configuration also allows fuel to be efficiently used in correspondence with the need for temperature increase.

In one general aspect, the controller for a hybrid vehicle is configured to, in the temperature increase control, execute the ignition timing retardation control while prohibiting an exhaust gas recirculation (EGR) control of recirculating exhaust gas to a combustion chamber.

When the EGR control is prohibited, misfire is unlikely to occur. Thus, the above-described configuration, in which the ignition timing retardation control is executed while the EGR control is prohibited, effectively suppresses the occurrence of misfire due to retardation of the ignition timing.

In one general aspect, the controller for a hybrid vehicle is configured to: when a deposit amount of the particulate matter in the filter is greater than or equal to a reference deposit amount, execute the temperature increase control while setting a target temperature to a first temperature and increase the temperature of the filter to the first temperature; and when the deposit amount of the particulate matter in the filter is less than the reference deposit amount, execute the temperature increase control while setting the target temperature to a second temperature, which is lower than the first temperature, and increase the temperature of the filter to the second temperature.

When the burned amount of PM per unit time in the filter regeneration control is constant, the time to complete the filter regeneration control is extended as the deposit amount of PM increases. The longer the time to complete the filter regeneration control, the more likely the filter regeneration control will be interrupted before being completed.

In contrast, the higher the temperature of the filter, the greater the burned amount of PM per unit time in the filter regeneration control becomes. The configuration in which the target temperature is set to the higher first temperature when the deposit amount of PM is great as described above increases the burned amount of PM per unit time during the filter regeneration control when the deposit amount of PM is great. This allows the filter regeneration control to be completed at an early stage.

In the controller for a hybrid vehicle in one general aspect, the hybrid vehicle includes a catalytic converter that is arranged in the exhaust passage of the internal combustion engine and purifies exhaust gas in addition to the filter. The controller is configured to prohibit the execution of the motoring control when the temperature of the filter is higher than or equal to a specified temperature even if the temperature of the filter is the temperature at which the particulate matter can be burned.

When oxygen is supplied to the filter by the motoring control, PM is burned and the filter temperature increases. If the motoring control is continued when the filter temperature is high, the heat generated in the filter heats the catalytic converter, so that the temperature of the catalytic converter may be excessively increased. With the above-described configuration, when the temperature of the filter is high, the motoring control stops being executed. This prevents excessive heating of the catalytic converter.

In the controller for a hybrid vehicle in one general aspect, the hybrid vehicle includes a catalytic converter that is arranged in a section of the exhaust passage of the internal combustion engine on an upstream side of the filter and purifies exhaust gas. The controller is configured to: determine whether the motoring control should be executed in accordance with a deposit amount of the particulate matter when a temperature of the catalytic converter has reached a temperature at which execution of a catalyst degradation limitation control of prohibiting the execution of the motoring control is requested; execute the motoring control without executing the catalyst degradation limitation control when the deposit amount of the particulate matter in the filter is greater than or equal to a determination deposit amount; and prohibit the execution of the motoring control while executing the catalyst degradation limitation control when the deposit amount of the particulate matter in the filter is less than the determination deposit amount.

If the motoring control is executed to supply oxygen to the catalytic converter when the temperature of the catalytic converter is high, the degradation of the catalyst may be promoted. To limit the degradation of the catalyst, the catalyst degradation limitation control may be executed to prohibit the execution of the motoring control when the temperature of the catalytic converter is high.

With the above-described configuration, when the deposit amount of PM is great and the need for completion of the filter regeneration control is great, the motoring control is given priority over the catalyst degradation limitation control, thereby completing the filter regeneration control at an early stage. When the deposit amount of PM is relatively small and the need for completion of the filter regeneration control is small, the catalyst degradation limitation control is given priority over the motoring control to limit the degradation of the catalytic converter. That is, the manner in which control is executed is switched in accordance with the necessity for the filter regeneration control to limit the degradation of the catalytic converter and complete the filter regeneration control at an early stage.

In one general aspect, the controller for a hybrid vehicle is configured to execute the motoring control on condition that a vehicle speed is higher than or equal to a specified vehicle speed.

When oxygen is supplied to the filter by the motoring control, PM is burned and the filter temperature increases. Depending on the layout of the filter in a hybrid vehicle, the execution of the motoring control at a low vehicle speed and with a small amount of relative wind blowing onto the filter results in an insufficient cooling effect of the relative wind. The temperature of the filter may thus be excessively increased. However, if the motoring control is executed on condition that the vehicle speed is higher than or equal to a specified vehicle speed, the motoring control is executed when a sufficient amount of relative wind is blowing onto the filter. The filter is thus prevented from excessively heated.

In another aspect, a controller configured to control a hybrid vehicle is provided. The hybrid vehicle has a battery that is charged with power generated by a motor-generator using output of an internal combustion engine. The controller includes circuitry configured to control the internal combustion engine and the motor-generator. The circuitry is configured to: execute an intermittent stop control of automatically stopping and restarting operation of the internal combustion engine; execute a temperature increase control of increasing the output of the internal combustion engine to increase an amount of generated heat and increasing an amount of power generated by the motor-generator, thereby increasing a temperature of a filter provided in an exhaust passage of the internal combustion engine to a temperature at which particulate matter can be burned; execute an intermittent stop prohibition control of prohibiting stop of the operation of the internal combustion engine from when the temperature increase control is started to when the temperature increase control is completed; and execute a motoring control of driving an output shaft of the internal combustion engine using the motor-generator on condition that the temperature of the filter is the temperature at which the particulate matter can be burned, thereby forcibly rotating the internal combustion engine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 100 for a hybrid vehicle will now be described with reference to FIGS. 1 to 8.

Figure 1:
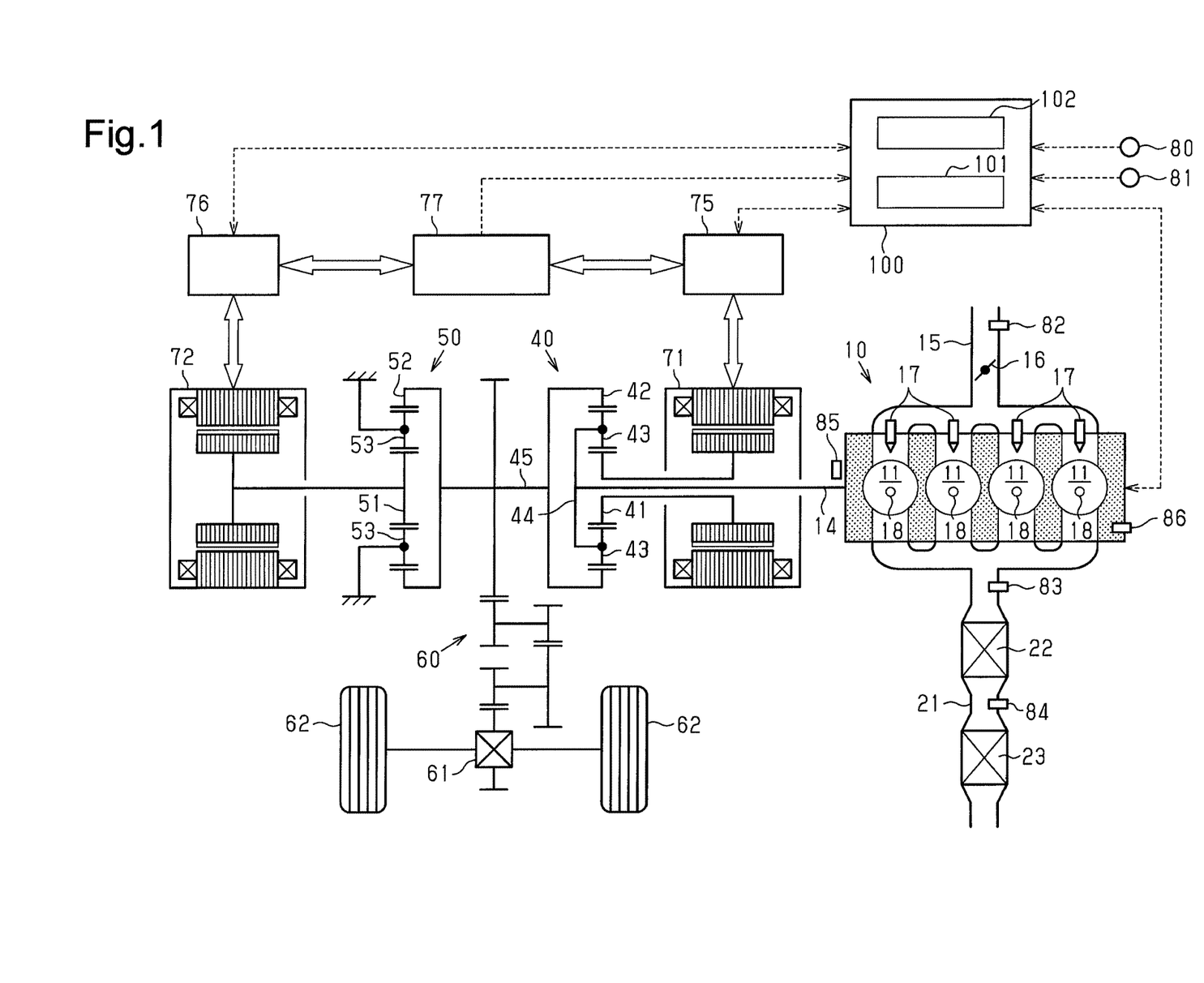
FIG. 1 is a schematic diagram showing a controller according to an embodiment and a hybrid vehicle controlled by the controller.

As shown in FIG. 1, the hybrid vehicle in which the controller 100 according to the present embodiment is employed includes a spark-ignition internal combustion engine 10. The hybrid vehicle also has two motor-generators, that is, a first motor-generator 71 and a second motor-generator 72 that can be used as both a motor and a generator. Furthermore, the hybrid vehicle includes a battery 77, a first inverter 75, and a second inverter 76. When the first motor-generator 71 and the second motor-generator 72 operate as generators, the battery 77 stores power generated by the first and second motor-generators 71, 72. Further, when the first motor-generator 71 and the second motor-generator 72 operate as motors, the battery 77 supplies power to the first and second motor-generators 71, 72. The first inverter 75 regulates the amount of power transferred between the first motor-generator 71 and the battery 77. The second inverter 76 regulates the amount of power transferred between the second motor-generator 72 and the battery 77.

The internal combustion engine 10 has cylinders 11, in which air-fuel mixture is burned. Also, the internal combustion engine 10 includes an intake passage 15, which serves as an introduction passage of air into the cylinders 11. A throttle valve 16, which regulates the intake air amount, is provided in the intake passage 15. A section of the intake passage 15 that is downstream of the throttle valve 16 branches out to correspond to the respective cylinders 11. Each of the branched sections of the intake passage 15 is provided with a fuel injection valve 17. Each cylinder 11 is provided with an ignition device 18 that ignites air-fuel mixture introduced into the cylinder 11 by spark discharge. Further, the internal combustion engine 10 is provided with an exhaust passage 21 serving as a discharge passage for exhaust gas generated by combustion of air-fuel mixture in each cylinder 11. A catalytic converter 22 configured to purify exhaust gas is provided in the exhaust passage 21. A filter 23 configured to trap PM is provided on the downstream side of the catalytic converter 22 in the exhaust passage 21.

Air-fuel mixture containing fuel injected by the fuel injection valves 17 is introduced into the cylinders 11 of the internal combustion engine 10 through the intake passage 15. When the ignition device 18 ignites the air-fuel mixture, combustion takes place in the cylinder 11. Exhaust gas generated by the combustion is discharged from the inside of the cylinder 11 to the exhaust passage 21. In the internal combustion engine 10, the catalytic converter 22 oxidizes HC and CO in the exhaust gas and reduces NOx. Furthermore, the filter 23 traps PM in the exhaust gas to purify the exhaust gas.

The hybrid vehicle has a first planetary gear mechanism 40. The first planetary gear mechanism 40 includes a sun gear 41, which is an external gear, and a ring gear 42, which is an internal gear coaxially arranged with the sun gear 41. Pinion gears 43 meshing with the sun gear 41 and the ring gear 42 are provided between the sun gear 41 and the ring gear 42. The pinion gears 43 are supported by a carrier 44 to be allowed to rotate and orbit. The carrier 44 of the first planetary gear mechanism 40 is coupled to a crankshaft 14, which is the output shaft of the internal combustion engine 10. The sun gear 41 is coupled to the first motor-generator 71. The ring gear 42 is connected to a ring gear shaft 45. The ring gear shaft 45 is coupled to driven wheels 62 via a speed reduction mechanism 60 and a differential mechanism 61. Also, the ring gear shaft 45 is coupled to the second motor-generator 72 via a second planetary gear mechanism 50.

The second planetary gear mechanism 50 includes a sun gear 51, which is an external gear, and a ring gear 52, which is an internal gear coaxially arranged with the sun gear 51. Pinion gears 53 meshing with the sun gear 51 and the ring gear 52 are provided between the sun gear 51 and the ring gear 52. Each pinion gear 53 is rotational but is not allowed to orbit. The ring gear 52 of the second planetary gear mechanism 50 is connected to the ring gear shaft 45. The sun gear 51 is connected to the second motor-generator 72.

The controller 100, which is configured to control the hybrid vehicle, is mounted on the hybrid vehicle. The controller 100 includes an engine controlling section 101 configured to control the internal combustion engine 10 and a motor-generator controlling section 102 configured to control the first motor-generator 71 and the second motor-generator 72. The controller 100 receives a detection signal indicating the operation amount of the accelerator pedal by the driver detected by an accelerator position sensor 80 and a detection signal indicating the vehicle speed, which is the traveling speed of the vehicle detected by a vehicle speed sensor 81. The controller 100 also acquires the state of charge, which represents the amount of power stored in the battery 77.

Furthermore, the controller 100 receives detection signals from the various types of sensors provided to the internal combustion engine 10. The internal combustion engine 10 has an air flowmeter 82, an air-fuel ratio sensor 83, an exhaust temperature sensor 84, a crank angle sensor 85, and a coolant temperature sensor 86. The air flowmeter 82 is provided in a section of the intake passage 15 that is on the upstream side of the throttle valve 16 to detect the intake air amount, which is the amount of air flowing through the intake passage 15. The air-fuel ratio sensor 83 is provided in a section of the exhaust passage 21 that is on the upstream side of the catalytic converter 22 to detect the concentration of oxygen included in the exhaust gas flowing through the exhaust passage 21. The exhaust temperature sensor 84 is provided in a section of the exhaust passage 21 between the catalytic converter 22 and the filter 23 to detect the temperature of the gas flowing out of the catalytic converter 22. The crank angle sensor 85 is provided in the vicinity of the crankshaft 14 to detect the rotation phase of the crankshaft 14. The coolant temperature sensor 86 detects the temperature of coolant flowing through the coolant circuit of the internal combustion engine 10. The controller 100 obtains the engine rotation speed, which is the rotation speed of the crankshaft 14 of the internal combustion engine 10, from the detection signal of the crank angle sensor 85.

Subsequently, the control of the hybrid vehicle executed by the controller 100 will be described. The controller 100 calculates the requested torque, which is the requested value of the torque output to the ring gear shaft 45, based on the operation amount of the accelerator pedal and the vehicle speed. The controller 100 determines the torque distribution of the internal combustion engine 10, the first motor-generator 71, and the second motor-generator 72 in accordance with parameters such as the requested torque and the state of charge of the battery 77 and controls the output of the internal combustion engine 10 and powering operation and regenerative operation performed by the first motor-generator 71 and the second motor-generator 72.

For example, the controller 100 causes the first motor-generator 71 to operate as a starter when starting the internal combustion engine 10. Specifically, the controller 100 causes the first motor-generator 71 to rotate the sun gear 41 to rotate the crankshaft 14, thereby starting the internal combustion engine 10. At this time, the torque of the second motor-generator 72 cancels the reaction force acting on the ring gear shaft 45 from the internal combustion engine 10.

When the vehicle is stopped, the controller 100 switches the control in correspondence with the state of charge. When the state of charge of the battery 77 is more than or equal to a specified value, the controller 100 stops the operation of the internal combustion engine 10 and does not drive the first motor-generator 71 or the second motor-generator 72. In contrast, when the state of charge of the battery 77 is less than the specified value, the controller 100 operates the internal combustion engine 10 and uses the output of the internal combustion engine 10 to drive the first motor-generator 71 such that the first motor-generator 71 operates as a generator. At this time, the torque of the second motor-generator 72 maintains the ring gear shaft 45 in a stopped state, so that the driven wheels 62 are not rotated.

Even during traveling, the controller 100 switches the control in correspondence with the state of charge. At the starting of the vehicle and during traveling under light load, if the state of charge of the battery 77 is more than or equal to the specified value, the controller 100 starts the hybrid vehicle and causes the hybrid vehicle to travel by using only the driving force of the second motor-generator 72. In this case, the internal combustion engine 10 is in a stopped state, and the first motor-generator 71 does not generate power. In contrast, at the starting of the vehicle and during traveling under light load, if the state of charge of the battery 77 is less than the specified value, the controller 100 starts the internal combustion engine 10 to generate power using the first motor-generator 71 and charges the battery 77 with the generated power. At this time, the hybrid vehicle travels by using some of the driving force of the internal combustion engine 10 and the driving force of the second motor-generator 72.

When the state of charge of the battery 77 is more than the specified value in a steady traveling state, the controller 100 operates the internal combustion engine 10 in a state of a high operating efficiency and causes the hybrid vehicle to travel chiefly with the output of the internal combustion engine 10. At this time, the force of the internal combustion engine 10 is divided into a portion corresponding to the driven wheels 62 and a portion corresponding to the first motor-generator 71 by the first planetary gear mechanism 40. Accordingly, the hybrid vehicle travels while generating power with the first motor-generator 71. The controller 100 uses the generated power to drive the second motor-generator 72 and uses the force of the second motor-generator 72 to assist the force of the internal combustion engine 10. When the state of charge of the battery 77 is less than the specified value in a steady traveling state, the controller 100 increases the engine rotation speed and uses the power generated by the first motor-generator 71 to drive the second motor-generator 72. The controller 100 also charges the battery 77 with the excess power.

During acceleration, the controller 100 increases the engine rotation speed and uses the power generated by the first motor-generator 71 to drive the second motor-generator 72 and accelerates the hybrid vehicle with the force of the internal combustion engine 10 and the force of the second motor-generator 72.

During deceleration, the controller 100 stops the operation of the internal combustion engine 10. The controller 100 then causes the second motor-generator 72 to operate as a generator and charges the battery 77 with the generated power. The hybrid vehicle uses the resistance produced through such power generation as a braking force.

As described above, the controller 100 stops the internal combustion engine 10 depending on the situation when the hybrid system is operating, for example, during traveling. That is, the engine controlling section 101 and the motor-generator controlling section 102 in the controller 100 are configured to execute an intermittent stop control to automatically stop and restart the internal combustion engine 10 depending on the situation.

As described above, in the internal combustion engine 10, the filter 23 provided in the exhaust passage 21 traps PM in the exhaust gas. When the trapped PM is deposited in the filter 23, the filter 23 may become clogged. In order to burn and remove the PM deposited in the filter 23, the temperature of the filter 23 needs to be increased to a temperature higher than or equal to the ignition point of PM, at which PM can be burned, and oxygen needs to be supplied to the filter 23.

Accordingly, the controller 100 is configured to execute a filter regeneration control to burn and remove PM deposited in the filter 23. The controller 100 is configured to execute a temperature increase control in the filter regeneration control. In the temperature increase control, the controller 100 increases the output of the internal combustion engine 10 to increase the amount of generated heat and increases the amount of power generated by the first motor-generator 71, thereby increasing the temperature of the filter 23 to a temperature at which PM can be burned. The controller 100 then executes a motoring control to drive the crankshaft 14 using the first motor-generator 71, thereby forcibly rotating the internal combustion engine 10. Accordingly, oxygen is supplied to the filter 23 so that PM is burned. That is, the filter regeneration control executed by the controller 100 includes the temperature increase control and the motoring control.

The filter regeneration control executed by the controller 100 will now be described.

Figure 2:
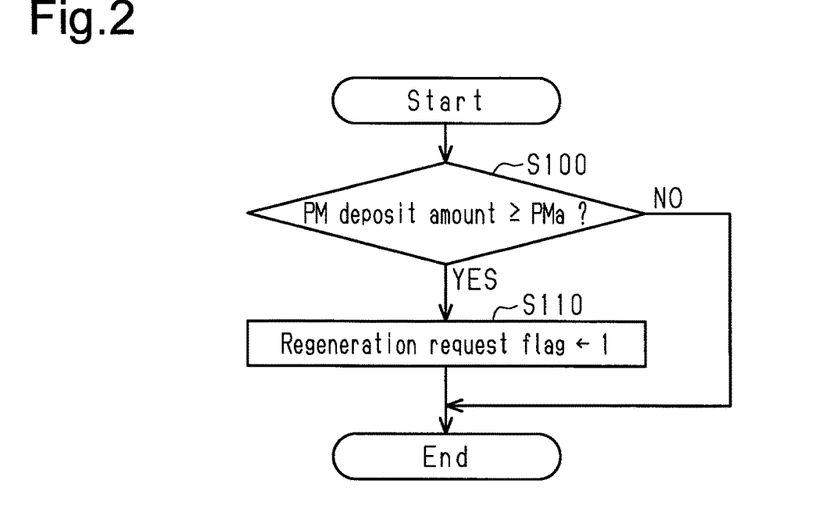
FIG. 2 is a flowchart showing the procedure of a routine of manipulating a regeneration request flag.
Figure 7:
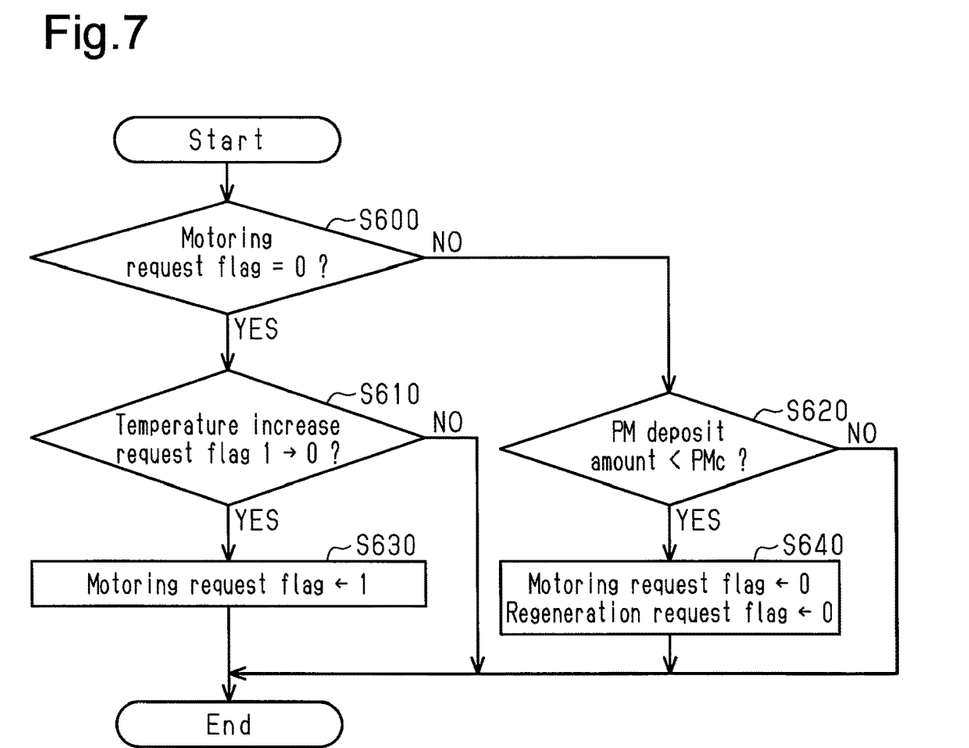
FIG. 7 is a flowchart showing the procedure of a routine of manipulating a motoring request flag.

With reference to FIG. 2, the routine executed to control a filter regeneration request flag will be described. This routine is repeatedly executed by the controller 100 while the hybrid system is operating. When having a value of 1, the filter regeneration request flag indicates that the filter regeneration control needs to be executed. When having a value of 0, the filter regeneration request flag indicates that the filter regeneration control does not need to be executed. The filter regeneration request flag has a value of 0 in the initial state. After being updated to 1, the filter regeneration request flag is updated to 0 when the filter regeneration control, which will be discussed below with reference to FIG. 7, is completed.

As shown in FIG. 2, when starting the routine, the controller 100 determines whether a PM deposit amount is greater than or equal to a first specified value PMa in the process of step S100. The PM deposit amount is an estimated value of the amount of PM deposited in the filter 23.

The controller 100 repeatedly calculates a PM generation amount and a PM regeneration amount and updates the PM deposit amount while the hybrid system is operating. Specifically, a difference obtained by subtracting the PM regeneration amount from the PM generation amount is added to the PM deposit amount before update, and the sum is calculated as the latest PM deposit amount. The PM deposit amount is thus updated.

The PM generation amount refers to the amount of PM that is generated by burning air-fuel mixture in the cylinders 11. The controller 100 calculates the PM generation amount from the operating state of the internal combustion engine 10, specifically, the intake air amount, the fuel injection amount, and the like.

The PM regeneration amount refers to the amount of PM burned in the filter 23. As the temperature of the gas flowing into the filter 23 increases, the temperature of the filter 23 increases. Accordingly, the temperature of the filter 23 can be obtained from the temperature detected by the exhaust temperature sensor 84. The controller 100 estimates a GPF temperature, which is the temperature of the filter 23, by using the temperature and the amount of gas flowing into the filter 23 and the heat balance model of the filter based on the outside air temperature. The amount of gas flowing into the filter 23 can be obtained from the intake air amount and the fuel injection amount, and the outside air temperature can be detected by the air flowmeter 82. Then, if gas containing oxygen flows into the filter 23 when the GPF temperature is higher than or equal to the ignition point, the PM deposited in the filter 23 starts burning. Since oxygen is needed to burn PM, the amount of the PM burned in the filter 23 is determined in correspondence with the amount of oxygen in the gas flowing into the filter 23. The oxygen concentration of the gas flowing into the filter 23 can be obtained from the detection result of the air-fuel ratio sensor 83. Accordingly, the controller 100 calculates the PM regeneration amount based on the temperature of gas detected by the exhaust temperature sensor 84, the oxygen concentration detected by the air-fuel ratio sensor 83, the intake air amount, and the fuel injection amount.

When determining that the PM deposit amount is greater than or equal to the first specified value PMa in the process of step S1 (step S100: YES), the controller 100 proceeds to the step of step S110. In the process of step S100, the controller 100 updates the regeneration request flag to 1.

After executing the process of step S110, the controller 100 temporarily suspends the current routine. In contrast, when determining that the PM deposit amount is less than the first specified value PMa in the process of step S100 (step S100: NO), the controller 100 temporarily suspends the routine without executing the process of step S110. As described above, the controller 100 controls the regeneration request flag in accordance with the PM deposit amount.

Next, with reference to FIG. 3, the routine executed to control a temperature increase request flag will be described. When having a value of 1, the temperature increase request flag indicates that the temperature increase control needs to be executed. When having a value of 0, the temperature increase request flag indicates that the temperature increase control does not need to be executed. This routine is repeatedly executed by the controller 100 when the regeneration request flag is 1, the warming of the catalytic converter 22 has been completed, and a motoring request flag is not 1. The motoring request flag, which will be discussed in detail below, is updated to 1 when the temperature increase control is completed. This routine is thus executed when the filter regeneration control needs to be executed, the catalytic converter 22 is activated, and the temperature increase control has not been completed.

Figure 3:
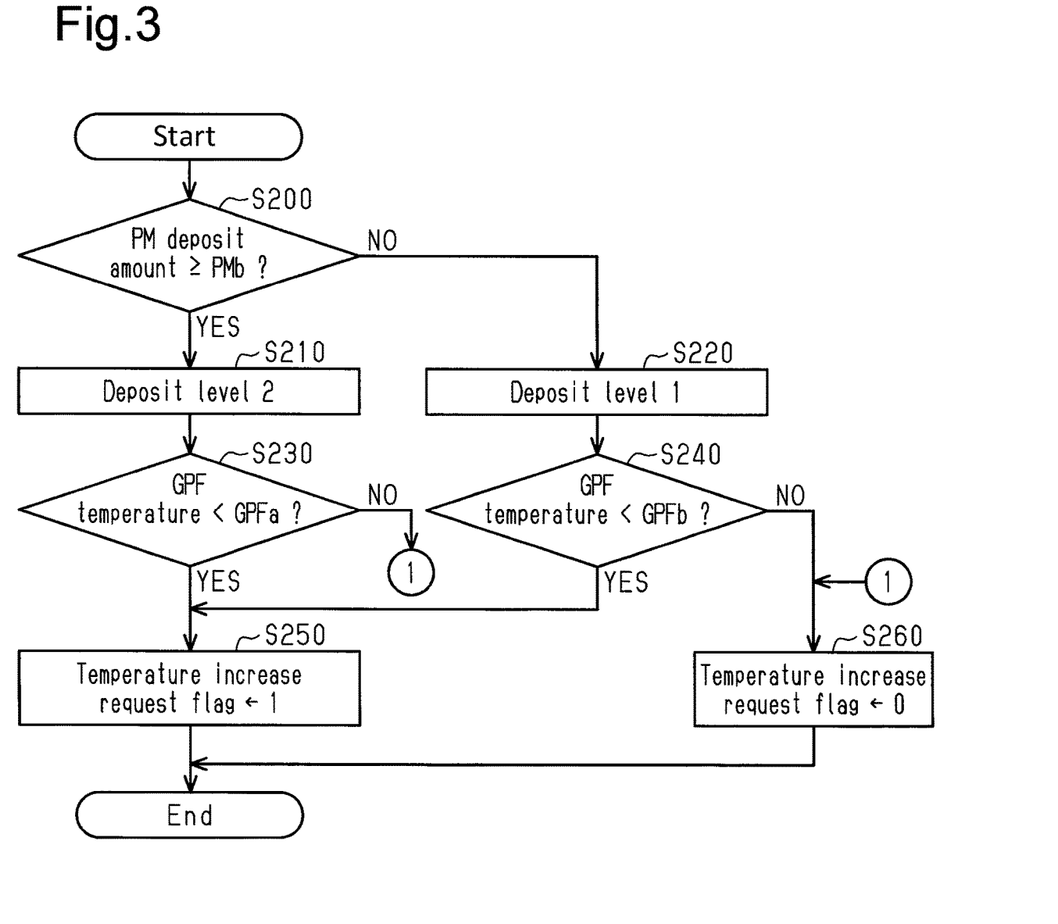
FIG. 3 is a flowchart showing the procedure of a routine of manipulating a temperature increase request flag.

As shown in FIG. 3, when starting this routine, the controller 100 determines whether the PM deposit amount is greater than or equal to a second specified value PMb in the process of step S200. The second specified value PMb is greater than the first specified value PMa.

When determining that the PM deposit amount is greater than or equal to the second specified value PMb in the process of step S200 (step S200: YES), the controller 100 proceeds to the process of step S210. In the process of step S210, the controller 100 determines that the deposit level of PM is deposit level 2. Deposit level 2 indicates that a relatively great amount of PM has deposited in the filter 23.

Thereafter, the controller 100 proceeds to the process of step S230. In the process of step S230, the controller 100 determines whether the GPF temperature is lower than a first temperature GPFa. The first temperature GPFa is higher than the ignition point of PM and is a target value of the temperature of the filter 23 in the temperature increase control in a case in which the deposit level is deposit level 2.

When determining that the GPF temperature is lower than the first temperature GPFa in the process of step S230 (step S230: YES), the controller 100 proceeds to the process of step S250. In the process of step S250, the controller 100 updates the temperature increase request flag to 1. That is, in this case, the GPF temperature has not reached the target temperature of deposit level 2, and the temperature increase control needs to be executed. The controller 100 thus updates the temperature increase request flag to 1.

In contrast, when determining that the GPF temperature is higher than or equal to the first temperature GPFa in the process of step S230 (step S230: NO), the controller 100 proceeds to process of step S260. In the process of step S260, the controller 100 updates the temperature increase request flag to 0. That is, in this case, the GPF temperature has reached the target temperature of deposit level 2, and the temperature increase control does not need to be executed. The controller 100 thus updates the temperature increase request flag to 0.

When determining that the PM deposit amount is less than the second specified value PMb in the process of step S200 (step S200: NO), the controller 100 proceeds to the process of step S220. In the process of step S220, the controller 100 determines that the deposit level of the PM is deposit level 1. Deposit level 1 indicates that PM of an amount that is less than that of deposit level 1 has deposited in the filter 23.

Thereafter, the controller 100 proceeds to the process of step S240. In the process of step S240, the controller 100 determines whether the GPF temperature is lower than a second temperature GPFb. The second temperature GPFb is higher than the ignition point of PM and is lower than the first temperature GPFa. The second temperature GPFb is a target value of the temperature of the filter 23 in the temperature increase control in a case in which the deposit level is deposit level 1.

When determining that the GPF temperature is lower than the second temperature GPFb in the process of step S240 (step S240: YES), the controller 100 proceeds to the process of step S250. In the process of step S250, the controller 100 updates the temperature increase request flag to 1. That is, in this case, the GPF temperature has not reached the target temperature of deposit level 1, and the temperature increase control needs to be executed. The controller 100 thus updates the temperature increase request flag to 1.

In contrast, when determining that the GPF temperature is higher than or equal to the second temperature GPFb in the process of step S240 (step S240: NO), the controller 100 proceeds to the process of step S260. In the process of step S260, the controller 100 updates the temperature increase request flag to 0. That is, in this case, the GPF temperature has reached the target temperature of deposit level 1, and the temperature increase control does not need to be executed. The controller 100 thus updates the temperature increase request flag to 0.

After executing the process of step S250 or S260, the controller 100 temporarily suspends the current routine. As described above, the controller 100 determines the deposit level in accordance with the PM deposit amount. The controller 100 updates the temperature increase request flag to 1 when the temperature increase control has not been completed and the GPF temperature has not reached the target temperature, which has been set in accordance with the deposit level. In contrast, the controller 100 updates the temperature increase request flag to 0 when the temperature increase control has been completed and the GPF temperature has reached the target temperature, which has been set in accordance with the deposit level.

Next, with reference to FIG. 4, the routine executed to control a degradation limitation request flag will be described. When having a value of 1, the degradation limitation request flag indicates that the catalyst degradation limitation control needs to be executed. When having a value of 0, the degradation limitation request flag indicates that the catalyst degradation limitation control does not need to be executed. This routine is repeatedly executed by the controller 100 when the warm-up of the catalytic converter 22 has been completed.

Figure 4:
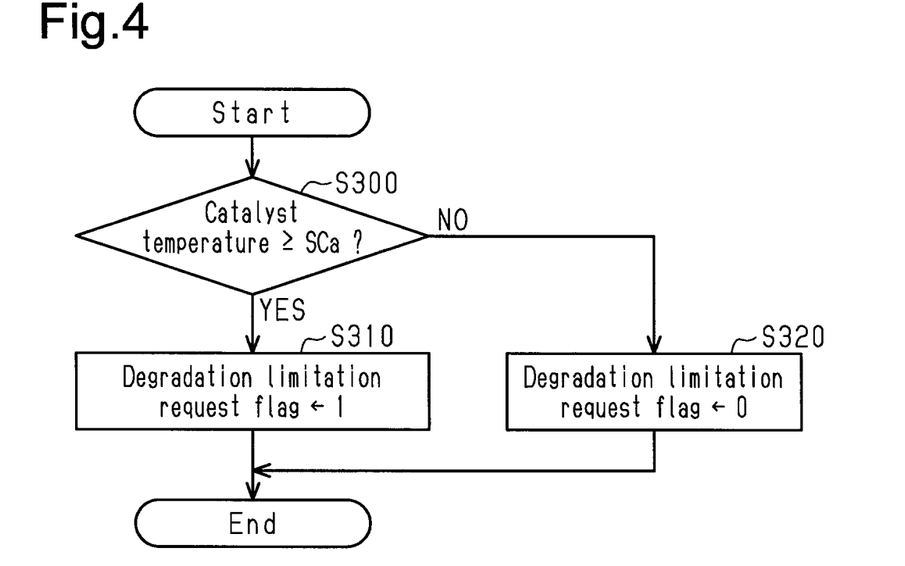
FIG. 4 is a flowchart showing the procedure of a routine of manipulating a degradation limitation request flag.

As shown in FIG. 4, when starting this routine, the controller 100 determines whether the catalyst temperature, which is the temperature of the catalytic converter 22, is higher than or equal to a reference temperature SCa in the process of step S300. The controller 100 estimates the catalyst temperature based on the temperature of gas detected by the exhaust temperature sensor 84.

If the motoring control is executed to supply oxygen to the catalytic converter 22 when the catalyst temperature is significantly high, oxidation reaction rapidly progresses, resulting in degradation of the catalyst in the catalytic converter 22. The lower limit of the catalyst temperature at which the catalyst in the catalytic converter 22 is degraded by execution of the motoring control is determined through experiments, and the reference temperature SCa is set based on that lower limit. That is, the reference temperature SCa is higher than the activation temperature and is set to a magnitude at which it can be determined that the catalyst in the catalytic converter 22 may be degraded by execution of the motoring control based on the catalyst temperature being higher than or equal to the reference temperature SCa.

When determining that the catalyst temperature is higher than or equal to the reference temperature SCa in the process of step S300 (step S300: YES), the controller 100 proceeds to the process of step S310. In the process of step S310, the controller 100 updates the degradation limitation request flag to 1.

In contrast, when determining that the catalyst temperature is lower than the reference temperature SCa in the process of step S300 (step S300: NO), the controller 100 proceeds to the process of step S320. In the process of step S320, the controller 100 updates the degradation limitation request flag to 0.

After executing the process of step S310 or S320, the controller 100 temporarily suspends the current routine. As described above, the controller 100 controls the degradation limitation request flag in accordance with the catalyst temperature.

Next, with reference to FIG. 5, the routine executed to control an intermittent stop prohibition flag will be described. This routine is repeatedly executed by the controller 100 when the regeneration request flag is 1. When having a value of 1, the intermittent stop prohibition flag indicates that stop of the operation of the internal combustion engine 10 by the above-described intermittent stop control needs to be prohibited. When having a value of 0, the intermittent stop prohibition flag indicates that stop of the operation of the internal combustion engine 10 by the intermittent stop control does not need to be prohibited. When the intermittent stop prohibition flag is 1, the controller 100 prohibits stop of the operation of the internal combustion engine 10 by the intermittent stop control and causes the internal combustion engine 10 to continue operating.

Figure 5:
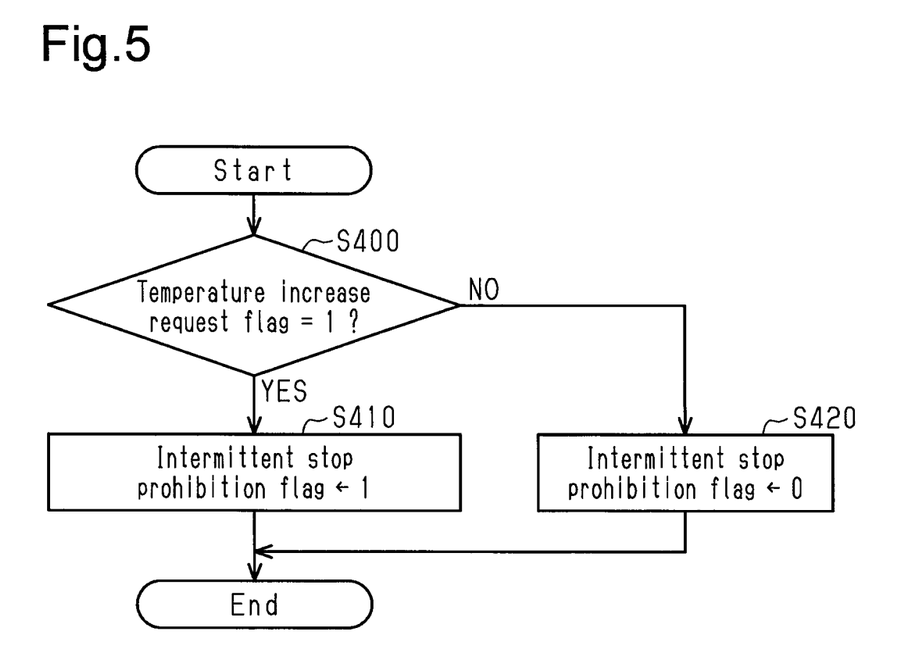
FIG. 5 is a flowchart showing the procedure of a routine of manipulating an intermittent stop prohibition flag.

As shown in FIG. 5, when starting this routine, the controller 100 determines whether the temperature increase request flag is 1 in the process of step S400. When determining that the temperature increase request flag is 1 in the process of step S400 (step S400: YES), the controller 100 proceeds to the process of step S410. In the process of step S410, the controller 100 updates the intermittent stop prohibition flag to 1.

In contrast, when determining that the temperature increase request flag is 0, that is, not 1 in the process of step S400 (step S400: NO), the controller 100 proceeds to the process of step S420. In the process of step S420, the controller 100 updates the intermittent stop prohibition flag to 0.

After executing the process of step S410 or S420, the controller 100 temporarily suspends the current routine. In this manner, the controller 100 updates the intermittent stop prohibition flag to 1 when the temperature increase request flag is 1, thereby prohibiting stop of the operation of the internal combustion engine 10 by the intermittent stop control. As described below with reference to FIG. 6, the controller 100 executes the temperature increase control when the temperature increase request flag is 1. That is, when the temperature increase request flag is 1 and the temperature increase control is being executed, the controller 100 prohibits stop of the operation of the internal combustion engine 10 by the intermittent stop control.

In this manner, once the controller 100 starts the temperature increase control, the controller 100 executes the intermittent stop prohibition control to prohibit stop of the operation of the internal combustion engine 10 by the intermittent stop control until the temperature increase control is completed, thereby causing the internal combustion engine 10 to continue operating.

Next, with reference to FIG. 6, the routine executed to select the type of the executed temperature increase control flag will be described. This routine is repeatedly executed by the controller 100 when the temperature increase request flag is 1.

Figure 6:
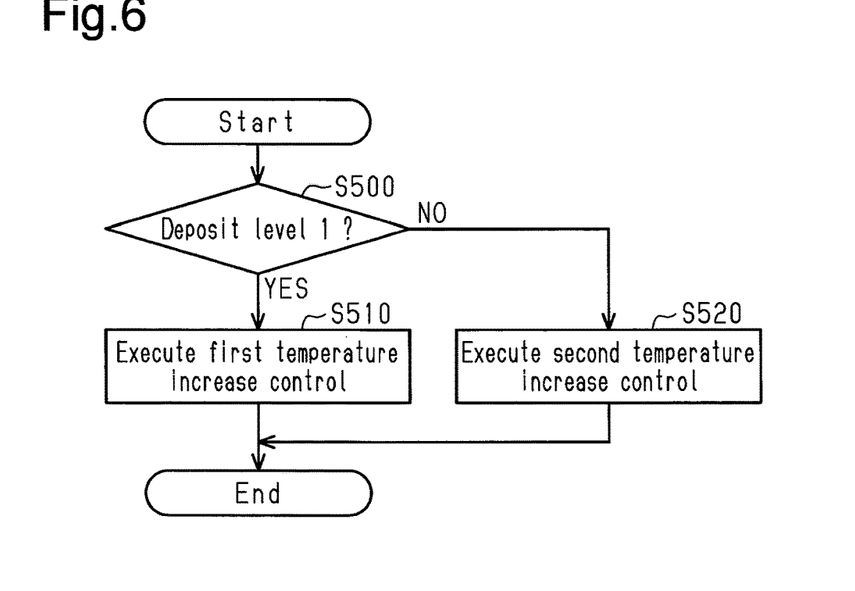
FIG. 6 is a flowchart showing the procedure of a routine of selecting a temperature increase control to be executed.

As shown in FIG. 6, when starting this routine, the controller 100 determines whether the deposit level of PM is deposit level 1 in the process of step S500. When determining that the PM deposit level is deposit level 1 (step S500: YES), the controller 100 proceeds to the process of step S510. In the process of step S510, the controller 100 executes a first temperature increase control as the temperature increase control.

In the first temperature increase control, the controller 100 executes an output raising control and an exhaust gas recirculation (EGR) prohibition control. The engine controlling section 101 executes an output control of the internal combustion engine 10 using a target value, which is a requested output. In the output raising control, the requested output is increased to a value that is greater than that in a case in which the temperature increase control is not executed. Since the execution of the output raising control increases the output of the internal combustion engine 10, the motor-generator controlling section 102 increases the amount of power generated by the first motor-generator 71. Accordingly, the increased amount of the output corresponding to the increase in the requested output is used to generate power, so that the fluctuation of the force at the ring gear shaft 45 is limited. The EGR prohibition control is a control to prohibit the EGR control that recirculates exhaust gas to the combustion chambers.

In contrast, when determining that the PM deposit level is deposit level 2 in the process of step S500, that is when determining that the PM deposit level is not deposit level 1 (step S500: NO), the controller 100 proceeds to the process of step S520. In the process of step S520, the controller 100 executes a second temperature increase control as the temperature increase control.

In the second temperature increase control, the controller 100 executes a lower limit raising control and an ignition timing retardation control in addition to the output raising control executed in the first temperature increase control. The lower limit raising control is a control to raise the lower limit rotation speed by raising the lower limit value of the engine rotation speed as compared to a case in which the temperature increase control is not executed. Accordingly, even when the requested output in the output control of the internal combustion engine 10 is zero, the operation is performed at the lower limit rotation speed. The ignition timing retardation control corrects and retards the ignition timing in the engine control executed by the engine controlling section 101 such that the ignition timing is more retarded than that in a case in which the temperature increase control is not executed. Retarding the ignition timing increases the exhaust temperature.

The controller 100 executes the temperature increase control through step S510 or step S520 and temporarily suspends the current routine. As described above, the controller 100 switches between two types of temperature increase control that have different control contents in accordance with the deposit level, or the deposit amount of PM. As described above with reference to FIG. 3, the first temperature GPFa, which is the target temperature in the case of deposit level 2, is higher than the second temperature GPFb, which is the target temperature in the case of deposit level 1. The first temperature increase control, which is executed in the case of deposit level 1, and the second temperature increase control, which is executed in the case of deposit level 2, have different target temperatures. As described above with reference to FIG. 3, when the GPF temperature reaches the target temperature, the temperature increase request flag is updated to 0. Accordingly, the routine shown in FIG. 6 is not executed, so that the temperature increase control is not executed. The temperature increase control is thus completed.

Next, with reference to FIG. 7, the routine executed to control the motoring request flag will be described. When having a value of 1, the motoring request flag indicates that the execution of the motoring control is requested. When having a value of 0, the motoring request flag indicates that the execution of the motoring control is not requested. This routine is repeatedly executed by the controller 100 when the regeneration request flag is 1.

As shown in FIG. 7, when starting this routine, the controller 100 determines whether the motoring request flag is 0 in the process of step S600. When determining that the motoring request flag is 0 in the process of step S600 (step S600: YES), the controller 100 proceeds to the process of step S610.

In the process of step S610, the controller 100 determines whether the temperature increase request flag has been updated from 1 to 0. In step S610, based on the value of the temperature increase request flag when this routine was executed last time and the value of the temperature increase request flag in the currently executed routine, the controller 100 determines that the temperature increase request flag has been updated from 1 to 0 when the value of the last execution is 1 and the value of the current execution is 0. This process is configured to determine whether the temperature increase control has been completed in the current routine.

When determining that the temperature increase request flag has been updated from 1 to 0 in the process of step S610 (step S610: YES), the controller 100 proceeds to the process of step S630. In the process of step S630, the controller 100 updates the motoring request flag to 1. Then, the controller 100 temporarily suspends the current routine. That is, the controller 100 updates the motoring request flag to 1 when the temperature increase control has been completed.

In contrast, when determining that the temperature increase request flag has not been updated from 1 to 0 in the process of step S610 (step S610: NO), the controller 100 temporarily suspends the routine without executing the process of step S630. That is, in this case, the motoring request flag is not updated but is maintained at 0.

When determining that the motoring request flag is 1, that is, not 0 in the process of step S600 (step S600: NO), the controller 100 proceeds to the process of step S620. In the process of step S620, the controller 100 determines whether the PM deposit amount is less than a third specified value PMc. The third specified value PMc is a threshold for determining completion of the filter regeneration control and is less than the first specified value PMa. That is, the third specified value PMc is set to a value at which it can be determined that PM has been sufficiently removed by the filter regeneration control, or the filter regeneration control has been completed, based on the fact that the PM deposit amount has dropped to a value less than the third specified value PMc.

When determining that the PM deposit amount is less than the third specified value PMc in the process of step S620 (step S620: YES), the controller 100 proceeds to the process of step S640. In the process of step S640, the controller 100 updates the motoring request flag to 0, and updates the regeneration request flag to 0. That is, this process corresponds to a process of ending the filter regeneration control.

In contrast, when determining that the PM deposit amount is greater than or equal to the third specified value PMc in the process of step S620 (step S620: NO), the controller 100 temporarily suspends the routine without executing the process of step S640. That is, in this case, the motoring request flag and the regeneration request flag are not updated but are both maintained at 1.

As described above, the controller 100 updates the motoring request flag to 1 when the temperature increase control is completed, and updates the motoring request flag to 0 when the PM deposit amount has dropped to a value less than the third specified value PMc.

Next, with reference to FIG. 8, the routine executed to determine whether the motoring control needs to be executed will be described. This routine is repeatedly executed by the controller 100 when the motoring request flag is 1.

Figure 8:
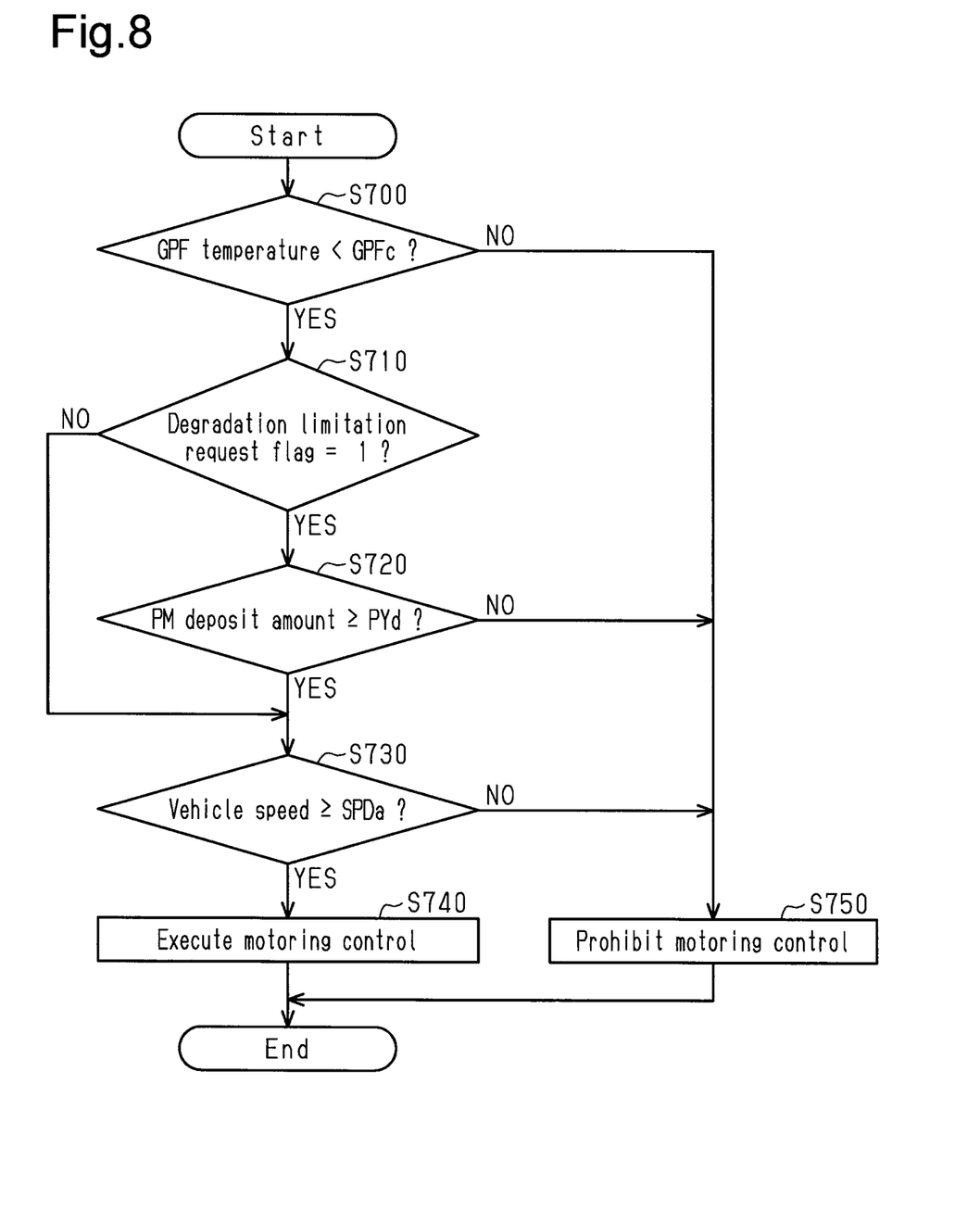
FIG. 8 is a flowchart showing the procedure of a routine of determining whether the motoring control should be executed.

As shown in FIG. 8, when starting this routine, the controller 100 determines whether the GPF temperature is lower than a third temperature GPFc in the process of step S700. The third temperature GPFc is higher than the first temperature GPFa. The third temperature GPFc is set as a threshold for determining whether the GPF temperature is too high to execute the motoring control. That is, the third temperature GPFc is set such that it can be determined that, based on the fact that the GPF temperature is higher than or equal to the third temperature GPFc, the execution of the motoring control may excessively heat the filter 23. In other words, the third temperature GPFc is set such that it can be determined that, based on the fact that the GPF temperature is lower than the third temperature GPFc, the execution of the motoring control will not excessively heat the filter 23.

When determining that the GPF temperature is higher than or equal to the third temperature GPFc in the process of step S700 (step S700: NO), the controller 100 proceeds to the process of step S750. The controller 100 prohibits the motoring control in the process of step S750. Then, the controller 100 temporarily suspends the current routine. That is, in this case, the execution of the motoring control may excessively heat the filter 23. Thus, even if the temperature increase control has been completed and the temperature of the filter 23 has reached a temperature at which PM can be burned so that the motoring request flag is 1, the controller 100 does not execute the motoring control.

In contrast, when determining that the GPF temperature is lower than the third temperature GPFc in the process of step S700 (step S700: YES), the controller 100 proceeds to the process of step S710. In s S710, the controller 100 determines whether the degradation limitation request flag is 1.

When determining that the degradation limitation request flag is 1 in the process of step S710 (step S710: YES), the controller 100 proceeds to the process of step S720. In the process of step S720, the controller 100 determines whether the PM deposit amount is greater than or equal to a fourth specified value PMd. The fourth specified value PMd is greater than the second specified value PMb. The fourth specified value PMd is a threshold for determining that the deposit amount of PM has become excessive, and the motoring control should be executed to quickly remove PM rather than prohibiting the motoring control by executing the catalyst degradation limitation control to limit the degradation of the catalyst in the catalytic converter 22.

When determining that the PM deposit amount is less than the fourth specified value PMd in the process of step S720 (step S720: NO), the controller 100 proceeds to the process of step S750. The controller 100 prohibits the motoring control in the process of step S750. Then, the controller 100 temporarily suspends the current routine. That is, in this case, the process of step S750 corresponds to the catalyst degradation limitation control, and the controller 100 does not execute the motoring control even if the motoring request flag is 1.

In contrast, when determining that the PM deposit amount is greater than or equal to the fourth specified value PMd in the process of step S720 (step S720: YES), the controller 100 proceeds to the process of step S730. In the process of step S730, the controller 100 determines whether the vehicle speed is higher than or equal to a specified vehicle speed SPDa. The specified vehicle speed SPDa is a threshold for determining whether the relative wind blowing onto the filter 23 is intense enough to limit excessive heating of the filter 23 due to the motoring control. The specified vehicle speed SPDa is set based on the results of experiments and the like such that it can be determined that the filter 23 will not be excessively heated even if the motoring control is executed based on the fact that the vehicle speed is higher than or equal to the specified vehicle speed SPDa.

When determining that the vehicle speed is higher than or equal to the specified vehicle speed SPDa in the process of step S730 (step S730: YES), the controller 100 proceeds to the process of step S740. The controller 100 executes the motoring control in the process of step S740. In the motoring control, the engine controlling section 101 of the controller 100 stops fuel injection and spark ignition in the internal combustion engine 10. The motor-generator controlling section 102 of the controller 100 then drives the crankshaft 14 using the first motor-generator 71, thereby forcibly rotating the internal combustion engine 10.

When the motoring control is executed when the temperature increase control is completed and the temperature of the filter 23 is a temperature that allows PM to be burned as described above, oxygen is supplied to the high-temperature filter 23 as the internal combustion engine 10 is forcibly rotated. This burns the PM deposited in the filter 23. In this manner, the controller 100 implements the filter regeneration control through the temperature increase control and the motoring control.

When determining that the vehicle speed is lower than the specified vehicle speed SPDa in the process of step S730 (step S730: NO), the controller 100 proceeds to the process of step S750. The controller 100 prohibits the motoring control in the process of step S750. Then, the controller 100 temporarily suspends the current routine. That is, in this case, the execution of the motoring control may result in insufficient cooling effect of the relative wind so that the filter 23 may be excessively heated. Thus, the controller 100 does not execute the motoring control. In this manner, the controller 100 executes the motoring control on condition that the vehicle speed is higher than or equal to the specified vehicle speed SPDa. The controller 100 prohibits the execution of the motoring control when the vehicle speed is lower than the specified speed SPDa even if other requirements are met.

When determining that the degradation limitation request flag is 0 in the process of step S710, that is, when the degradation limitation request flag is not 1 (step S710: NO), the controller 100 proceeds to the process of step S730 without executing the process of step S720. That is, in this case, since the catalyst degradation limitation control does not need to be executed, the controller 100 proceeds to the process of step 730 without executing the process of step S720, in which it is determined which of the catalyst degradation limitation control and the motoring control should be prioritized in accordance with the PM deposit amount. Then, as described above, the controller 100 executes the motoring control through the process of the step S730 and subsequent steps on condition that the vehicle speed is higher than or equal to the specified speed SPDa.

This routine, which has been described with reference to FIG. 8, is executed when the motoring request flag is 1. The motoring request flag is updated to 1 when the temperature increase control has been completed and the temperature of the filter 23 has reached a temperature at which PM can be burned. The motoring control is executed in this routine. That is, the motoring control by the controller 100 is executed on condition that the temperature of the filter 23 is a temperature at which PM can be burned.

The operation and advantages of the controller 100 according to the present embodiment will now be described.

(1) The controller 100 executes the motoring control when the temperature increase control is executed and the temperature of the filter is a temperature at which PM can be burned. When the motoring control is executed, oxygen is supplied to the high-temperature filter 23 as the internal combustion engine 10 is forcibly rotated. This burns PM deposited in the filter 23. That is, the controller 100 implements the filter regeneration control through the temperature increase control and the motoring control.

When the temperature increase control is started, the controller 100 prohibits stop of the operation of the internal combustion engine 10 by the intermittent stop control until the temperature increase control is completed. Thus, the temperature increase control is prevented from being interrupted by stop of the operation of the internal combustion engine 10. Accordingly, the temperature increase control is completed quickly to burn PM.

(2) In the temperature increase control, the output raising control increases the requested output, which corresponds to the target value in the output control executed by the engine controlling section 101. This increases the output of the internal combustion engine 10 as compared to a case in which the output raising control is not executed.

(3) In the temperature increase control, the controller 100 executes the lower limit raising control of raising the lower limit of the engine rotation speed in addition to the output raising control. Even if the requested output is zero, that is, even if there is no request for output from the internal combustion engine 10, the execution of the lower limit raising control in addition to the output raising control causes the internal combustion engine 10 to continue to operate at an engine rotation speed higher than that in a case in which the lower limit raising control is not executed. Therefore, the temperature of the filter 23 continues to increase even if there is no request for output from the internal combustion engine 10.

(4) In the second temperature increase control, the controller 100 executes the ignition timing retardation control in addition to the output raising control. In the ignition temperature increase control, the exhaust temperature can be increased by retarding the ignition timing, so that the temperature increase control is executed effectively. When the output raising control and the ignition timing retardation control are executed together in the second temperature increase control, the ignition timing is retarded at an operating point of a higher load and a greater intake air amount. Thus, the exhaust temperature can be increased while suppressing the occurrence of misfire due to retardation of the ignition timing.

(5) The controller 100 sets the second specified value PMb as the specified deposit amount, and executes the second temperature increase control to execute the ignition timing retardation control on condition that the PM deposit amount in the filter 23 is greater than or equal to the second specified value PMb. When the PM deposit amount is less than the second specified value PMb, the controller 100 executes the first temperature increase control, in which the ignition timing retardation control is not executed.

When the ignition timing is retarded, the amount of fuel consumed to gain the same output is increased. Thus, the controller 100 executes the ignition timing retardation control during the temperature increase control only in a case in which the deposition amount of PM is great and the temperature increase control is preferably completed at an early stage. This allows fuel to be used efficiently in correspondence with the need for temperature increase.

(6) The controller 100 executes the ignition timing retardation control in the second temperature increase control, while prohibiting the EGR control of recirculating exhaust gas to the combustion chambers. When the EGR control is prohibited, misfire is unlikely to occur. Thus, the controller 100 executes the ignition timing retardation control while prohibiting the EGR control, thereby effectively suppressing the occurrence of misfire due to retardation of the ignition timing.

(7) The controller 100 sets the second specified value PMb as the reference deposit amount, and executes the second temperature increase control using the first temperature as the target temperature when the PM deposit amount is greater than or equal to the second specified value PMb. When the PM deposit amount is less than the second specified value PMb, the controller 100 executes the first temperature increase control using the second temperature as the target temperature. When the burned amount of PM per unit time in the filter regeneration control is the same, the time to complete the filter regeneration control is extended as the deposit amount of PM increases. The longer the time to complete the filter regeneration control, the more likely the filter regeneration control will be interrupted before being completed.

In contrast, the higher the temperature of the filter, the greater the burned amount of PM per unit time in the filter regeneration control becomes. The controller 100, which sets the target temperature to the first temperature, which is higher than the second temperature, when the deposit amount of PM is great as described above, increases the burned amount of PM per unit time during the filter regeneration control when the deposit amount of PM is great. This allows the filter regeneration control to be completed at an early stage.

(8) The controller 100 sets the third temperature GPFc as the specified temperature, and prohibits the execution of the motoring control when the GPF temperature is higher than or equal to the third temperature GPFc. When oxygen is supplied to the filter 23 by the motoring control, PM is burned and the filter temperature increases. If the motoring control is continued when the filter temperature is high, the heat generated in the filter 23 heats the catalytic converter 22, so that the temperature of the catalytic converter 22 may be excessively increased. Since the controller 100 stops executing the motoring control when the temperature of the filter 23 is higher than or equal to the third temperature GPFc, excessive heating of the catalytic converter is prevented.

(9) The controller 100 sets the fourth specified value PMd as the determination deposit amount, and executes the motoring control without executing the catalyst degradation limitation control when the PM deposit amount is greater than or equal to the fourth specified value PMd. In contrast, when the PM deposit amount is less than the fourth specified value PMd, the controller 100 executes the catalyst degradation limitation control and prohibits the execution of the motoring control.

If the motoring control is executed to supply oxygen to the catalytic converter 22 when the temperature of the catalytic converter 22 is high, the degradation of the catalyst may be promoted. Thus, to limit the degradation of the catalyst, it is effective to execute the catalyst degradation limitation control to prohibit the execution of the motoring control when the temperature of the catalytic converter 22 is high.

When the PM deposit amount is greater than or equal to the fourth specified value PMd and the need for completion of the filter regeneration control is great, the controller 100 gives priority to the motoring control over the catalyst degradation limitation control in an attempt to complete the filter regeneration control at an early stage. When the deposit amount of PM is less than the fourth specified value PMd and the need for completion of the filter regeneration control is small, the catalyst degradation limitation control is given priority over the motoring control to limit the degradation of the catalytic converter 22. That is, the manner in which control is executed is switched in accordance with the necessity for the filter regeneration control to limit the degradation of the catalytic converter 22 and complete the filter regeneration control at an early stage.

(10) The controller 100 executes the motoring control on condition that the vehicle speed is higher than or equal to the specified speed SPDa. When oxygen is supplied to the filter 23 by the motoring control, PM is burned and the filter temperature increases. Depending on the layout of the filter 23 in a hybrid vehicle, the execution of the motoring control at a low vehicle speed and with a small amount of relative wind blowing onto the filter 23 results in an insufficient cooling effect of the relative wind. The temperature of the filter 23 may thus be excessively increased. However, if the controller 100 executes the motoring control on condition that the vehicle speed is higher than or equal to the specified vehicle speed SPDa, the motoring control is executed when a sufficient amount of relative wind is blowing onto the filter 23. The filter 23 is thus prevented from excessively heated.

The present embodiment may be modified as follows. The present embodiment and the following modifications can be combined as long as the combined modifications remain technically consistent with each other.

In the above-described embodiment, when the PM deposit amount is greater than or equal to the fourth specified value PMd, the motoring control is executed without executing the catalyst degradation limitation control. Instead, regardless of the PM deposit amount, the execution of the motoring control may be prohibited when the catalyst degradation limitation control is requested.

In the above-described embodiment, the ignition timing retardation control is executed in addition to the output raising control in the second temperature increase control. The ignition timing retardation control may be omitted. The temperature of the filter 23 can be increased by executing only the output raising control.

In the above-described embodiment, the ignition timing retardation control does not necessarily need to be executed on condition that the PM deposit amount is greater than or equal to the specified deposit amount. The ignition timing retardation control may be executed regardless of whether the PM deposit amount is greater than or equal to the specified deposit amount during the temperature increase control.

In the above-described embodiment, the amount of retardation of the ignition timing may be progressively reduced as the PM deposit amount decreases when the ignition timing retardation control is executed. This configuration also allows fuel to be efficiently used in correspondence with the need for temperature increase.

In the above-described embodiment, the ignition timing retardation control is executed while the EGR control is prohibited. Instead of prohibiting the EGR control, the EGR amount may be reduced as the PM deposit amount decreases as in the case of the amount of retardation of the ignition timing. Such limitation on the EGR amount and prohibition of the EGR control may be omitted. Although the temperature increase control is often executed during the cold start, the EGR control may not be executed during cold start depending on the specification of the internal combustion engine. In a hybrid vehicle with such an internal combustion engine, the EGR control is not executed when the temperature increase control is executed, so that there is no need to prohibit the EGR control.

In the above-described embodiment, the lower limit raising control is executed in addition to the output raising control in the temperature increase control. Instead, the lower limit raising control may be omitted. That is, the temperature of the filter 23 can be increased by executing only the output raising control.

In the above-described embodiment, the second specified value PMb is the reference deposit amount and the specified deposit amount. Alternatively, the reference deposit amount and the specified deposit amount may have different values.

In the above-described embodiment, the target temperature is switched between two values in accordance with the reference deposit amount. Instead of switching the target temperature between two values, the target temperature may be switched among three or more values. The target temperature may be progressively increased as the deposit amount at the time of starting the temperature increase control increases.

In the above-described embodiment, multiple controls are executed in combination as the temperature increase control. As an example of a set of controls that are switched in accordance with the PM deposit amount, the first temperature increase control and the second temperature increase control are switched in accordance with the PM deposit amount. Alternatively, the contents of the combined controls are not limited to those illustrated in the above-described embodiment. Any suitable combination of multiple controls may be executed in accordance with the PM deposit amount, and the controls that are combined may be changed in accordance with the PM deposit amount.

The method of increasing the output of the internal combustion engine 10 is not limited to the output raising control, which increases the requested output. For example, the output of the internal combustion engine 10 can be increased not by changing the requested output but by increasing the intake air amount and the fuel injection amount. The output of the internal combustion engine 10 can also be increased by advancing the ignition timing As long as the same control in the above-described embodiment can be implemented, specific processes are not limited to those described with reference to FIGS. 2 to 8. For example, although the processes are executed by setting various flags in the above-described embodiment, such flags do not necessarily need to be set.

The logic related to the estimation of the PM deposit amount in the above-described embodiment is merely one example, and other logic may be employed.

In the above-described embodiment, the motoring control is executed on condition that the vehicle speed is higher than or equal to the specified speed SPDa. Instead, the condition related to the vehicle speed may be omitted, and the motoring control may be executed when the motoring request flag is 1. That is, regardless of the vehicle speed, the motoring control may be executed when the execution of the motoring control is requested.

In the above-described embodiment, the time at which the temperature increase control is completed is determined based on the temperature of the filter 23. Alternatively, the time at which the temperature increase control is completed may be determined based on other parameters such as the duration of the temperature increase control.

The controller 100 may be employed in any type of hybrid vehicle different from the one illustrated in FIG. 1 as long as the hybrid vehicle includes the internal combustion engine 10 provided with the filter 23 arranged in the exhaust passage 21 and a motor capable of transmitting force to the internal combustion engine 10. For example, the filter 23 may be arranged on the upstream side of the catalytic converter 22. Alternatively, a catalyst may be supported by the filter 23, and the exhaust passage 21 may be provided with a unit having the same function as that of the catalytic converter 22. In this case, the catalytic converter 22 is omitted.

The controller 100 is not limited to a device that includes a CPU and a memory and executes software processing. For example, at least part of the processes executed by the software in the above-described embodiment may be executed by hardware circuits dedicated to the execution of these processes (such as ASIC). That is, the controller 100 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller configured to control a hybrid vehicle, the hybrid vehicle having a battery that is charged with power generated by a motor-generator using output of an internal combustion engine, the controller comprising:
   an engine controlling section configured to control the internal combustion engine; and
   a motor-generator controlling section configured to control the motor-generator, wherein
   the controller is configured to use the engine controlling section and the motor-generator controlling section to
      execute an intermittent stop control of automatically stopping and restarting operation of the internal combustion engine,
      execute a temperature increase control of increasing the output of the internal combustion engine to increase an amount of generated heat and increasing an amount of power generated by the motor-generator, thereby increasing a temperature of a filter provided in an exhaust passage of the internal combustion engine to a temperature at which particulate matter can be burned, execute an intermittent stop prohibition control of prohibiting stop of the operation of the internal combustion engine from when the temperature increase control is started to when the temperature increase control is completed, and execute a motoring control of driving an output shaft of the internal combustion engine using the motor-generator on condition that the temperature of the filter is the temperature at which the particulate matter can be burned, thereby forcibly rotating the internal combustion engine.

2. The controller for a hybrid vehicle according to claim 1, wherein the controller is configured to, in the temperature increase control, execute an output raising control of increasing a requested output as a control of increasing the output of the internal combustion engine.

3. The controller for a hybrid vehicle according to claim 2, wherein the controller is configured to, in the temperature increase control, execute a lower limit raising control of raising a lower limit of an engine rotation speed, in addition to the output raising control.

4. The controller for a hybrid vehicle according to claim 2, wherein the controller is configured to, in the temperature increase control, execute an ignition timing retardation control of retarding an ignition timing, in addition to the output raising control.

5. The controller for a hybrid vehicle according to claim 4, wherein the controller is configured to execute the ignition timing retardation control in the temperature increase control on condition that a deposit amount of the particulate matter in the filter is greater than or equal to a specified deposit amount, and prohibit the ignition timing retardation control in the temperature increase control when the deposit amount of the particulate matter in the filter is less than the specified deposit amount.

6. The controller for a hybrid vehicle according to claim 4, wherein the controller is configured to, in the ignition timing retardation control, progressively reduce an amount of retardation of the ignition timing as a deposit amount of the particulate matter decreases.

7. The controller for a hybrid vehicle according to claim 4, wherein the controller is configured to, in the temperature increase control, execute the ignition timing retardation control while prohibiting an exhaust gas recirculation control of recirculating exhaust gas to a combustion chamber.

8. The controller for a hybrid vehicle according to claim 1, wherein the controller is configured to when a deposit amount of the particulate matter in the filter is greater than or equal to a reference deposit amount, execute the temperature increase control while setting a target temperature to a first temperature and increase the temperature of the filter to the first temperature, and when the deposit amount of the particulate matter in the filter is less than the reference deposit amount, execute the temperature increase control while setting the target temperature to a second temperature, which is lower than the first temperature, and increase the temperature of the filter to the second temperature.

9. The controller for a hybrid vehicle according to claim 1, wherein the hybrid vehicle includes a catalytic converter that is arranged in the exhaust passage of the internal combustion engine and purifies exhaust gas in addition to the filter, and the controller is configured to prohibit the execution of the motoring control when the temperature of the filter is higher than or equal to a specified temperature even if the temperature of the filter is the temperature at which the particulate matter can be burned.

10. The controller for a hybrid vehicle according to claim 1, wherein the hybrid vehicle includes a catalytic converter that is arranged in a section of the exhaust passage of the internal combustion engine on an upstream side of the filter and purifies exhaust gas, and the controller is configured to determine whether the motoring control should be executed in accordance with a deposit amount of the particulate matter when a temperature of the catalytic converter has reached a temperature at which execution of a catalyst degradation limitation control of prohibiting the execution of the motoring control is requested, execute the motoring control without executing the catalyst degradation limitation control when the deposit amount of the particulate matter in the filter is greater than or equal to a determination deposit amount, and prohibit the execution of the motoring control while executing the catalyst degradation limitation control when the deposit amount of the particulate matter in the filter is less than the determination deposit amount.

11. The controller for a hybrid vehicle according to claim 1, wherein the controller is configured to execute the motoring control on condition that a vehicle speed is higher than or equal to a specified vehicle speed.

12. A controller configured to control a hybrid vehicle, the hybrid vehicle having a battery that is charged with power generated by a motor-generator using output of an internal combustion engine, the controller comprising:

circuitry configured to control the internal combustion engine and the motor-generator, wherein the circuitry is configured to automatically stop and restart operation of the internal combustion engine, increase the output of the internal combustion engine to increase an amount of generated heat and increase an amount of power generated by the motor-generator, thereby increasing a temperature of a filter in an exhaust passage of the internal combustion engine to a temperature at which particulate matter can be burned, prohibit stop of the operation of the internal combustion engine from when the increase of the output of the internal combustion engine is started to when the increase of the output of the internal combustion engine is completed, and cause an output shaft of the internal combustion engine to be forcibly driven by the motor-generator after the temperature of the filter is the temperature at which the particulate matter can be burned, thereby forcibly rotating the internal combustion engine.

13. The controller for a hybrid vehicle according to claim 1, wherein fuel injection and ignition are stopped during the motoring control.

14. The controller for a hybrid vehicle according to claim 12, wherein fuel injection and ignition are stopped while the output shaft of the internal combustion engine is forcibly driven by the motor generator.

* * * * *